United States Patent
Beas-Garcia et al.

(10) Patent No.: US 7,454,774 B2
(45) Date of Patent: Nov. 18, 2008

(54) SELF-SERVICE MULTIPLE-DIRECTOR REMOTE PRODUCTION AND PROGRAMME BROADCASTING SERVER DEVICE AND TELEVISION NETWORK

(75) Inventors: Jacques Beas-Garcia, Toulouse (FR); Francois Rimbert, Toulouse (FR); Patrick Gelard, Donneville (FR); Philippe Chibaudel, Lanta (FR); Robert Rumeau, Balma (FR)

(73) Assignee: Centre National d'Etudes Spatiales (C.N.E.S.), Paris (FR)

( * ) Notice: Subject to any disclaimer, the term of this patent is extended or adjusted under 35 U.S.C. 154(b) by 1325 days.

(21) Appl. No.: 10/332,143

(22) PCT Filed: Jul. 5, 2001

(86) PCT No.: PCT/FR01/02163

§ 371 (c)(1),
(2), (4) Date: Jan. 6, 2003

(87) PCT Pub. No.: WO02/03697

PCT Pub. Date: Jan. 10, 2002

(65) Prior Publication Data
US 2004/0015987 A1 Jan. 22, 2004

(30) Foreign Application Priority Data
Jul. 6, 2000 (FR) .................................. 00 08812

(51) Int. Cl.
*G06F 3/00* (2006.01)
*H04N 7/173* (2006.01)
*H04N 5/225* (2006.01)

(52) U.S. Cl. .................... 725/37; 725/105; 715/740; 715/741; 715/751; 348/207.1

(58) Field of Classification Search .............. 348/211.3, 348/211.12, 722, 211.99; 725/37
See application file for complete search history.

(56) References Cited

U.S. PATENT DOCUMENTS 4,949,248 A * 8/1990 Caro .......................... 709/203

(Continued)

FOREIGN PATENT DOCUMENTS

EP 0 696 127 2/1996

(Continued)

OTHER PUBLICATIONS

Pank, R.A., , "Technology serving the broadcaster", Publication Date: Sep. 14-18, 1995, Quantel Ltd., Newbury.*

(Continued)

*Primary Examiner*—Ngoc-Yen T Vu
*Assistant Examiner*—Michael Osinski
(74) *Attorney, Agent, or Firm*—Young & Thompson

(57) ABSTRACT

A server device for self-service multiple-directing remote production and program broadcasting on a channel of at least a television network (TV1, TV2) includes an apparatus for input connection to at least a first digital data transmission network (2, 3) adapted to authorise the setting up of a communication with at least a particular remote director belonging to a group of suitable and registered remote directors. Automatic sensing and converting devices generate a video signal based on graphic data produced by each connected remote director (OPi), and connectors for telebroadcasting them on the television channel.

22 Claims, 2 Drawing Sheets

U.S. PATENT DOCUMENTS

Figure 1:
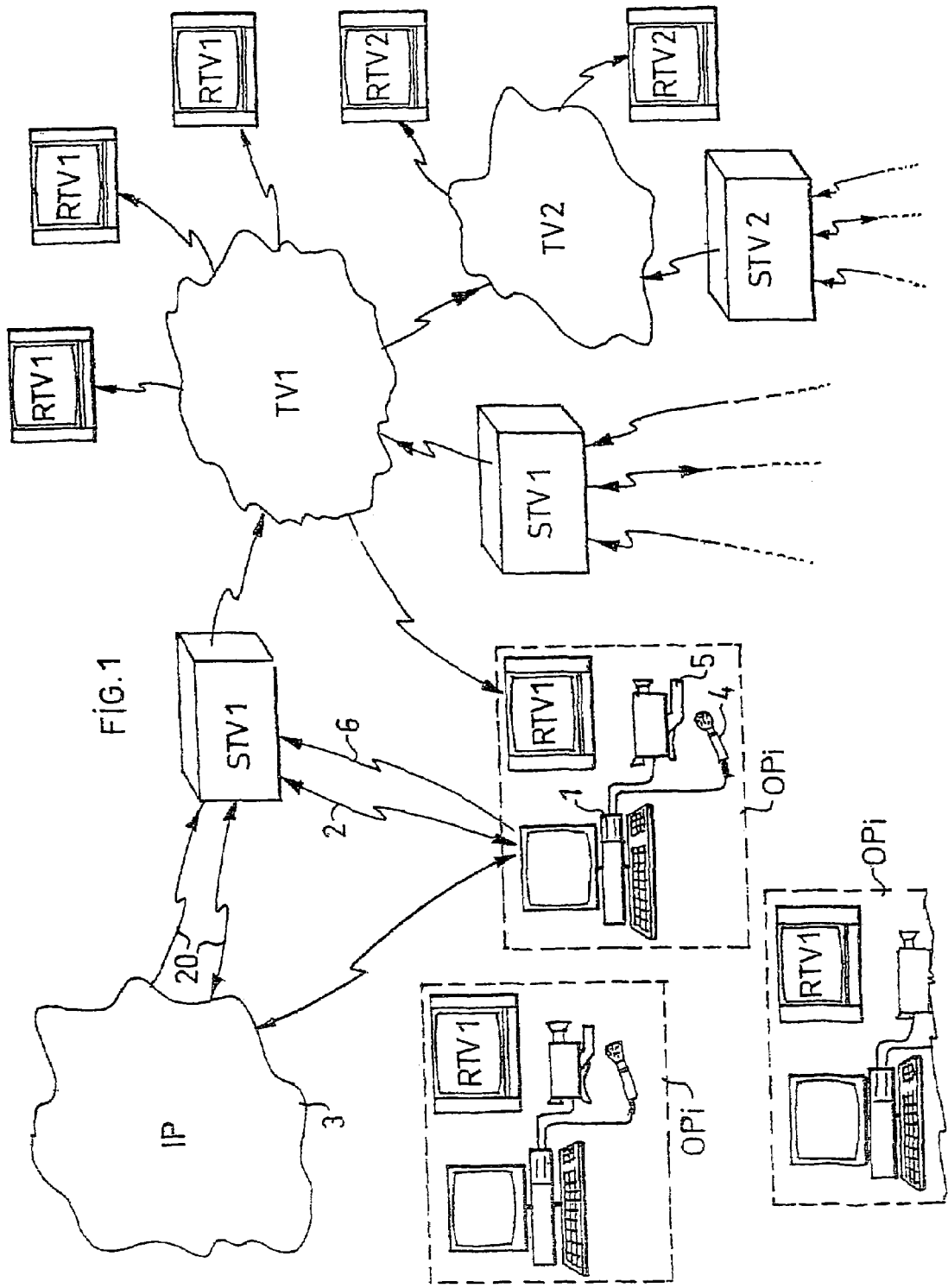

| | | | | |
|---|---|---|---|---|
| 5,208,665 | A * | 5/1993 | McCalley et al. | 725/119 |
| 5,247,347 | A * | 9/1993 | Litteral et al. | 725/114 |
| 5,442,389 | A * | 8/1995 | Blahut et al. | 725/92 |
| 5,570,126 | A | 10/1996 | Blahut et al. | |
| 5,583,561 | A * | 12/1996 | Baker et al. | 725/93 |
| 5,671,225 | A * | 9/1997 | Hooper et al. | 370/468 |
| 5,675,738 | A * | 10/1997 | Suzuki et al. | 709/219 |
| 5,684,799 | A | 11/1997 | Bigham et al. | |
| 5,754,774 | A * | 5/1998 | Bittinger et al. | 709/203 |
| 5,877,821 | A * | 3/1999 | Newlin et al. | 348/724 |
| 5,880,792 | A | 3/1999 | Ward et al. | |
| 5,930,473 | A * | 7/1999 | Teng et al. | 709/204 |
| 5,955,710 | A * | 9/1999 | DiFranza | 187/396 |
| 5,999,970 | A * | 12/1999 | Krisbergh et al. | 725/109 |
| 6,006,257 | A | 12/1999 | Slezak | |
| 6,072,483 | A * | 6/2000 | Rosin et al. | 715/716 |
| 6,198,510 | B1 * | 3/2001 | Suzukawa et al. | 348/552 |
| 6,250,428 | B1 * | 6/2001 | Amo et al. | 187/391 |
| 6,526,449 | B1 * | 2/2003 | Philyaw et al. | 709/238 |
| 6,598,074 | B1 * | 7/2003 | Moller et al. | 709/204 |
| 6,774,926 | B1 * | 8/2004 | Ellis et al. | 348/14.01 |
| 7,103,905 | B2 * | 9/2006 | Novak | 725/46 |
| 7,249,366 | B1 * | 7/2007 | Flavin | 725/25 |
| 2003/0025722 | A1 * | 2/2003 | Cliff et al. | 345/700 |
| 2004/0148353 | A1 * | 7/2004 | Karaoguz et al. | 709/205 |
| 2008/0155629 | A1 * | 6/2008 | Liwerant et al. | 725/110 |

FOREIGN PATENT DOCUMENTS

| | | |
|---|---|---|
| WO | WO 97/26608 | 7/1997 |
| WO | WO 98/16045 | 4/1998 |
| WO | WO 2005/041083 A1 * | 6/2005 |

OTHER PUBLICATIONS

D'Luna, L.J., "A single-chip universal cable set-top box/modem transceiver", Publication Date: Nov. 1999, Solid-State Circuits, IEEE Journal of, vol. 34 Issue: 11, pp. 1647-1660.*

Jose Alvear; "RealNetworks' RealAudio and RealVideo", pp. 183-202 XP002150113.

* cited by examiner

SELF-SERVICE MULTIPLE-DIRECTOR REMOTE PRODUCTION AND PROGRAMME BROADCASTING SERVER DEVICE AND TELEVISION NETWORK

The invention concerns a server device for self-service multiple-producer remote production and remote broadcasting of programs on at least one television network. It also extends to a television network which includes at least one such device.

Public or private television networks can be microwave, cable or satellite networks, analog or digital, single-channel or multichannel. The programs which are broadcast on each channel are produced by a single producer, who controls and produces the entire content according to a programming schedule which the producer alone defines.

Additionally, with the development of digital information transmission networks such as the Internet or intranet networks, it is possible (e.g. see http://www.real.com) to broadcast, on these networks, programs of the same type as television or radio programs. In this case, any user who is equipped with production means and masters the technology can himself or herself create programs and broadcast them, or receive such programs with a computer which is connected to the digital information transmission network. Nevertheless, apart from the fact that the quality of these programs is affected to a large extent by the indifferent performance of present-day transmission lines, such television or radio channels are only accessible by persons who possess a computer which can be connected to the network, and who master the technology and IT skill which are necessary to use it. Many persons are not yet equipped with a computer and/or do not master its use, but on the other hand are regular, faithful television viewers.

IT devices which enable a producer to produce and manage a television channel, and control the remote broadcasting of it via a video remote broadcasting device which receives information from the IT device and transmits it on a television network channel, are also known.

Numerous interactive television systems (U.S. Pat. Nos. 5,684,799; 5,570,126, etc.), in which each remote viewing user can interact with the program producers, in particular to make individual selections of programs to be received individually, are also known.

Throughout the text, the term "produce" and its derivatives ("production", "producer", etc.) designate the fact that one person, called the "producer", can devise, construct and generate a sequence of graphic or audiovisual information which can be remotely broadcast automatically, with no interruption from a starting instant to an ending instant, from when it is launched, and if necessary recorded as such. In particular, a simple selection of a sequence which has already been produced and recorded is not a production in the sense of this invention. Production of a sequence or program in the sense of this invention assumes filming, and/or construction of graphics, pictures, text, animation, effects, video, sound etc., and/or multiple selections of the information which others have produced.

The term "remotely produce" and its derivatives ("remote production", "remote producer", etc.) thus designate the fact of producing sequences from a distance, via telecommunication and/or remote transmission means (digital information transmission network). Similarly, the term "remotely broadcast" and its derivatives ("remote broadcasting", etc.) designate the fact of unrolling and broadcasting, on one channel of a television network which is intended for every television viewer's receiver which is capable of and authorized for receiving this channel, a sequence for reading without interruption and automatically from when it is launched, in the manner of traditional television programs. In the most common case, of multiple television viewer's receivers, they all receive this broadcast sequence (program) simultaneously.

None of the known devices or systems provides, on a traditional television network, "remote production" functions, i.e. enable any one of multiple remote producers to remotely produce programs which are remotely broadcast on a traditional television network (i.e. able to be picked up on standard receiving television sets). The inventors have determined that such a device would provide significant advantages, and could be the subject of numerous applications.

It would thus be advantageous to allow any person who belongs to a predetermined group to remotely produce and remotely broadcast, to the various television viewers who receive at least one television network channel, any information or program of each viewer's choice.

The invention therefore aims at proposing a multiple-producer remote production server device for self-service, i.e. on which any person who belongs to a predetermined group can remotely produce and remotely broadcast, on at least one private or public television network, at least graphic information (teletext, pictures, animation, display effects, video, etc.) of his or her choice, simply by remote use of the server device.

The invention also aims at proposing such a server device at very low cost, both as an investment and in use. The invention also aims at proposing such a server device which is easy to install and use, and which can easily be used by any person who knows how to use a microcomputer for connection to a digital information transmission system such as the Internet network, even by non-specialists in IT. The invention also aims at proposing a television network consisting of at least one channel which provides self-service multiple-producer remote production functions.

The invention therefore concerns a server device for self-service multiple-producer remote production and automatic remote broadcasting of programs on one channel of at least one television network which is intended for every television viewer who is capable of and authorized for receiving this channel. This server device comprises:

at least one IT device, called the remote broadcasting device, comprising:
  a screen controller,
  means for automatic capture and conversion of graphic information sequences which are addressed to and processed by the screen controller, and are adapted to generate at least one video signal which represents these graphic information sequences and which is compatible with at least one television network,
  means for single-channel connection to a television network which is adapted to transmit, on the said channel, such a video signal which is output by the automatic capture and conversion means,
IT resources and means, called input connection means, for connection to at least one first digital information transmission network, the IT resources and input connection means being adapted to:
  authorize the establishment of communication with at least one arbitrary distant remote producer OPi, called the connected remote producer, who belongs to a group of remote producers who are capable of and authorized for establishing communication with the IT resources via at least one such first network, enabling this connected remote producer to access the IT resources remotely via the first network,
  form IT production means which can enable any connected remote producer OPi to access at least part of the IT resources, and to remotely produce, using these IT resources which he or she controls remotely via the input connection means, at least one sequence of graphic information which can be transmitted to a screen controller, transmit to the screen controller of at least one remote broadcasting device at least one sequence of graphic information which has been remotely produced by at least one remote producer, in such a way that this sequence is remotely broadcast on the television network channel.

Thus information sequences which are remotely broadcast on the television network channel can be produced by each remote producer using the IT resources of the server device. Each remote producer can control these IT resources remotely via the input connection means.

The invention therefore makes it possible and proposes, for the first time, to associate with a television network a self-service multi-producer (or "multi-remote-producer") remote production network. The remote producers (users of the server device) can use the server device as they wish, on their initiative, without necessitating the assistance or supervision of a third party.

The invention is distinguished from interactive television systems by numerous aspects. In interactive television, television viewers can select individual programs, but cannot themselves produce a sequence which is remotely broadcast on a channel to each television viewer; in the invention, remote producers can be different from television viewers (at least one television viewer—and in general multiple television viewers—not being remote producers); in the invention, remotely produced sequences are remotely broadcast to all television viewers who are capable of and authorized for receiving the television channel; etc. The invention thus concerns the mode of producing programs (interactive for remote producers), whereas interactive television is concerned with the individual reception of programs which have been produced in advance.

Advantageously and according to the invention, the server device includes software means of managing the networks, enabling any connected remote producer to control the server device remotely.

Advantageously and according to the invention, the said first network is a network which is compatible with IP ("Internet Protocol"), in particular the public Internet network. The said first network can be a public analog or digital telephone network, a private analog or digital telephone network, or a private digital IT network (intranet, extranet, etc.). It is known, in particular, that telephone networks make transmission of digital information possible.

Each remote producer who is remote from the server device is himself or herself equipped with IT and connection means, enabling him or her to connect to the said first network, and to access remotely, as a client, the IT resources of the server device. The IT means of each remote producer and the said IT resources must be compatible. In other words, a server device according to the invention includes IT resources which are compatible with the IT means of each remote producer who is able to connect, i.e. who belongs to the said group. If necessary, there is nothing to prevent multiplying the IT resources in a server device according to the invention, and in particular introducing various standard operating systems (WINDOWS®, WINDOWS NT®, LINUX®, UNIX®, etc.). In the last case, the IT resources advantageously include several distinct IT systems, which are themselves distinct from the broadcasting device. Routing means can be integrated with input connection means to link a remote producer to the appropriate compatible IT system, automatically or on request by a remote producer.

Graphic information can include text, and/or pictures (drawings, photographs, etc.), and/or display effects, and/or graphic animation in two or three dimensions, and/or video sequences.

Although incorporation of sound in graphic information sequences is unnecessary in all applications of the invention, it is advantageous in most of them. Consequently, advantageously and according to the invention, the server device is one wherein the broadcasting device includes means, called sound cards, which are capable of generating at least one sound signal, and wherein the broadcasting device is adapted to incorporate each sound signal from its output of the sound card into the said video signal.

Additionally, live transmission of sound simultaneously with pictures or other graphic information or data via the most widely used digital information transmission networks such as the switched telephone network which is used to access the Internet network still raises problems of transmission rate and synchronization. Consequently, advantageously and according to the invention, the server device includes means of establishing independent audio communication—in particular by telephone—of sound between the connected remote producer and the single-channel connection means. These means comprise an independent sound transmission line and an automatic device, which is connected to the single-channel connection means on the television network, for connection to this independent sound transmission line.

In this way, two communication links to the server device can be established simultaneously and in parallel by each remote producer: one for remote access to the IT resources of the server device and transmission of digital information—particularly graphic information—and the other for transmission of sound between the remote producer and the television network channel (commentary, music etc.). The quality of the sound is thus improved, in particular for programs which are remotely broadcast live.

The IT resources and input connection means are adapted to form production IT means which are capable of enabling a connected remote producer to access at least part of the IT resources, and to remotely produce at least one information sequence, using these IT resources.

Advantageously and according to the invention, the IT resources include software means which are capable of opening (i.e. loading into RAM) files which represent graphic and/or sound information. In this way, a connected remote producer can make the server device open (i.e. load into RAM) software which makes it possible to edit and display text and/or pictures and/or graphic animation and/or display effects and/or video sequences and/or sound, making it possible to remotely produce sequences to be remotely broadcast on the said television network channel, with and on the IT resources of the server device.

Additionally, advantageously and according to the invention, the server device includes means, called output connection means, for connection to at least one second digital information transmission network, these output connection means being adapted, like the IT resources, to enable a connected remote producer to access this second network from the server device to consult information and/or to load information remotely onto the server device. This information is subsequently incorporated into a graphic information sequence in the course of production, and in particular is addressed to the screen controller of the remote broadcasting device, and thus remotely broadcast as it is as part of the remotely produced sequence.

Advantageously and according to the invention, the second network is an IP-compatible network—in particular the public Internet network—and the IT resources include software means for navigating on this network. It can also be a private network (intranet, extranet, etc.).

Advantageously and according to the invention, the input connection means and IT resources are adapted to receive digital information which represents graphic and/or sound information which are transmitted by a connected remote producer, the IT resources being adapted to allow incorporation of this information in the produced information sequences, and therefore in the video signal which is output and remotely broadcast on the said channel. Information sequences which are remotely broadcast on the television channel can thus consist, at least in part, of the information which is transmitted by a remote producer to the server device via the said first network.

Thus, advantageously and according to the invention, the server device includes software means which are adapted to receive audio and/or video information sequences via the first network, and to allow a connected remote producer to address these sequences, live or deferred, using the said IT resources, to the screen controller and/or the sound card of at least one remote broadcasting device of the server device, with the intention of incorporating them in the video signal which is output and remotely broadcast on the said channel.

In this way, a connected remote producer can produce graphic information sequences from information which is recorded on a mass memory of the IT resources of the server device itself; and/or information which is transmitted by the remote producer who is connected to the IT resources of the server device via the said first network; and/or information which is read and/or remotely loaded via at least one second network (such as the content (text, pictures, sound, video, etc.) of Internet sites or e-mail or remotely transmitted (FTP protocol) files) from the IT resources of the server device, which is itself remotely controlled by the remote producer who is connected via the first network. It should be noted that the two last information sources can be combined to the extent that the information which is obtained via the second network can be output by a station of the same connected remote producer, in particular an IT station which is used by the connected remote producer for communication via the first network.

The first and second networks can also be the same (in particular the Internet network).

Thus the information sequences can be produced by a remote producer who is connected using IT resources from three distinct information sources: information which is recorded in the server device, and/or information which is transmitted to the server device via the first network, and/or information which is obtained via the second network from the server device, which is itself remotely controlled by the remote producer who is connected via the first network.

According to another variant (which can be combined with the previous one), graphic information sequences can be entirely produced by a remote producer from his or her own IT means (and without using the IT resources of the server device), and then transmitted to the server device via the input connection means.

Additionally, advantageously and according to the invention, in a first variant, the input connection means and IT resources are adapted to authorize, at each instant, establishment of communication with any one and only one arbitrary distant remote producer, who is the only one to access the IT resources and to be able to produce a graphic information sequence. In this way, the server device cannot be accessed by a remote producer if another remote producer is already connected. The IT resources can be adapted to limit the time for which each remote producer is connected, and/or the remaining connection time of a connected remote producer from the instant at which another remote producer attempts to connect, which can be detected by the input connection means. More generally, the input connection means and IT resources can be adapted to limit the dates and/or times and/or connection durations of certain remote producers or groups of remote producers.

In another variant, the input connection means and IT resources are adapted to authorize, at each instant, establishment of communication with multiple different arbitrary distant remote producers. In a first subvariant according to the invention, the IT resources are adapted to allow access to these IT resources, at every instant, by one and only one connected remote producer. The other connected remote producers can then be made to wait. There too, the duration of access by each connected remote producer to the IT resources can be limited to a predetermined constant absolute value, and/or the remaining access duration of a connected remote producer can be limited from the moment at which a second remote producer connects.

The IT resources can be adapted so that the remaining duration of access to the IT resources is communicated to the connected remote producer during access, and the waiting duration is communicated to each other remote producer.

The first variant and first subvariant described above are advantageous, in particular, in the case in which the programs which the connected remote producer produces are output in real time, as they are produced, i.e. live or slightly deferred, by a single remote broadcasting device on one television network.

Thus, advantageously and according to the invention, the IT resources, the input connection means, the means of automatic capture and conversion, and the connection means are adapted to be able to output the video signal live on the television network.

In a second subvariant according to the invention, the IT resources are adapted so that they can be shared, at each instant, by multiple connected remote producers.

Nevertheless, each broadcasting device can receive only one information sequence forming one program, and can only remotely broadcast one video signal on one channel. For this reason, the simplest version of the invention, corresponding to the first variant mentioned above, is generally sufficient. It should nevertheless be noted that a connected remote producer can also, thanks to the output connection means, incorporate the information which is output by other remote producers into the sequences which he or she remotely produces, forming the remotely broadcast program. For example, a connected remote producer can connect to a video conference in progress on a digital network (e.g. the Internet), and choose to address the information which forms this video conference to the remote broadcasting device as a program on the television network. The invention thus allows televisual broadcasting of video conferences at low cost.

Advantageously and according to the invention, the IT resources also include means of recording the graphic information sequences which a connected remote producer produces, and means by which the connected remote producer can program the deferred remote broadcasting of these graphic information sequences on the television network. This recording is particularly advantageous with the second subvariant, for successive remote broadcasting of sequences which are produced by different remote producers.

The input connection means can be of the type with totally free access by any remote producer who has the means and information, which may be public, to make it possible to establish the connection. Nevertheless, preferably, advantageously and according to the invention, the input connection means are of the type with an access authorization code. The access authorization code can be collective, i.e. common to all remote producers of the group which is authorized to access the server device. Preferably, the input connection means include means of identifying each connected remote producer, and the IT resources are adapted to record the identification of each connected remote producer and associate it with each graphic information sequence which he or she remotely produces. In this way, the risks of remote broadcasting of programs which are prohibited on the television network are minimized, because the author of such programs can be identified.

Additionally, advantageously and according to the invention, the IT resources are adapted to supply a standby screen automatically by default to the screen controller, in the absence of a graphic information sequence which a remote producer has produced to be output. In this way, the absence of a connected remote producer is noticed immediately by the television viewers of the said television network channel. In the same way, a standby sound can be broadcast with the standby screen. This standby sound can be a music program, an information program, a radio channel, etc.

As a variant, the IT resources can be adapted to remotely broadcast, by default, the programs of a channel which is accessible via the second network, in particular a television channel via the Internet, i.e. output from an Internet site.

Advantageously and according to the invention, the connection means are chosen from the means of connection to a cable television network, the means of connection to a microwave television network, the means of connection to a digital television network via satellite. The choice of television network depends only on the targeted public of television viewers, which may be localized or not, and restricted to a group of persons or not. In particular, advantageously and according to the invention, the input connection means include means of establishing communication according to at least one standard protocol—in particular H320 or H323—making remote broadcasting of video conferences by the server device possible.

Advantageously, a server device according to the invention is presented in the form of a box enclosing a microcomputer central processing unit architecture. It does not necessarily include the traditional peripherals of the human-machine interface (screen, keyboard, pointer, etc.), but incorporates the cards and software to manage such peripherals, to enable it to be remotely controlled by a connected remote producer. Additionally, it includes automatic conversion means to generate the television video signal.

In this case, the same microcomputer can be used as both the remote broadcasting device and IT resources, and incorporate the input and output connection means, and/or be associated with these connection means (external peripherals). In the simplest variant of the invention, the server device is essentially a remote broadcasting device which is accessible by self-service thanks to input connection means, and outputs graphic information sequences which are addressed by the remote producers (these sequences being produced by each remote producer autonomously and independently) on the said television network channel automatically according to a predetermined programming mode, e.g. in the order in which they were received.

As a variant, the single-channel remote broadcasting device can consist of a machine (e.g. a microcomputer) which is distinct from the IT resources and input connection means, which can consist of another machine (e.g. another microcomputer) which is linked to the remote broadcasting device by a network (which can be a public network such as the Internet). The different machines can be situated on the same site or on different sites. The IT resources then transmit to the broadcasting device information sequences which form the programs to be remotely broadcast (remotely broadcast by the remote producer(s)). This transmission can be automatic, or initiated and carried out under the control of each remote producer.

Advantageously and according to the invention, the remote broadcasting device addresses graphic information sequences to its screen controller automatically, e.g. in the order in which it receives the information sequences which are remotely produced by the various remote producers, live or deferred. As a variant, the broadcasting device can incorporate software which enables each remote producer to program the various programs to be remotely broadcast. This software can be parameterized to limit the possible dates and/or times and/or durations of remote broadcasting for predetermined remote producers or groups of remote producers, and/or to assign different remote broadcasting priority levels to certain remote producers or groups of remote producers.

The invention extends to an analog or digital cable, microwave or satellite television network, such that it includes at least one server device for self-service multiple-producer remote production and automatic remote broadcasting of programs on one channel of this television network. Thanks to the invention, any authorized remote producer (who may or may not also be a television viewer who accesses the television network) who has an IT station can remotely produce and remotely broadcast programs of his or her choice on the television network channel, thanks to the server device. No central producer is necessary to control the programs which are remotely produced and remotely broadcast in a collegial, mutual manner, on the responsibility of each connected remote producer.

The invention also extends to a server device and a television network, which in combination have all or some of the features mentioned above or below.

The invention can be the subject of very numerous applications, in particular to implement:

a remote broadcasting channel for video conferences,
a local television channel (regional, municipal or at the level of a housing estate, building or company),
a television channel which is intended for narrow, targeted communities (professional, thematic, corporate, commercial, association, sporting, game, linguistic, cultural, educational, etc.).

Figure 2:
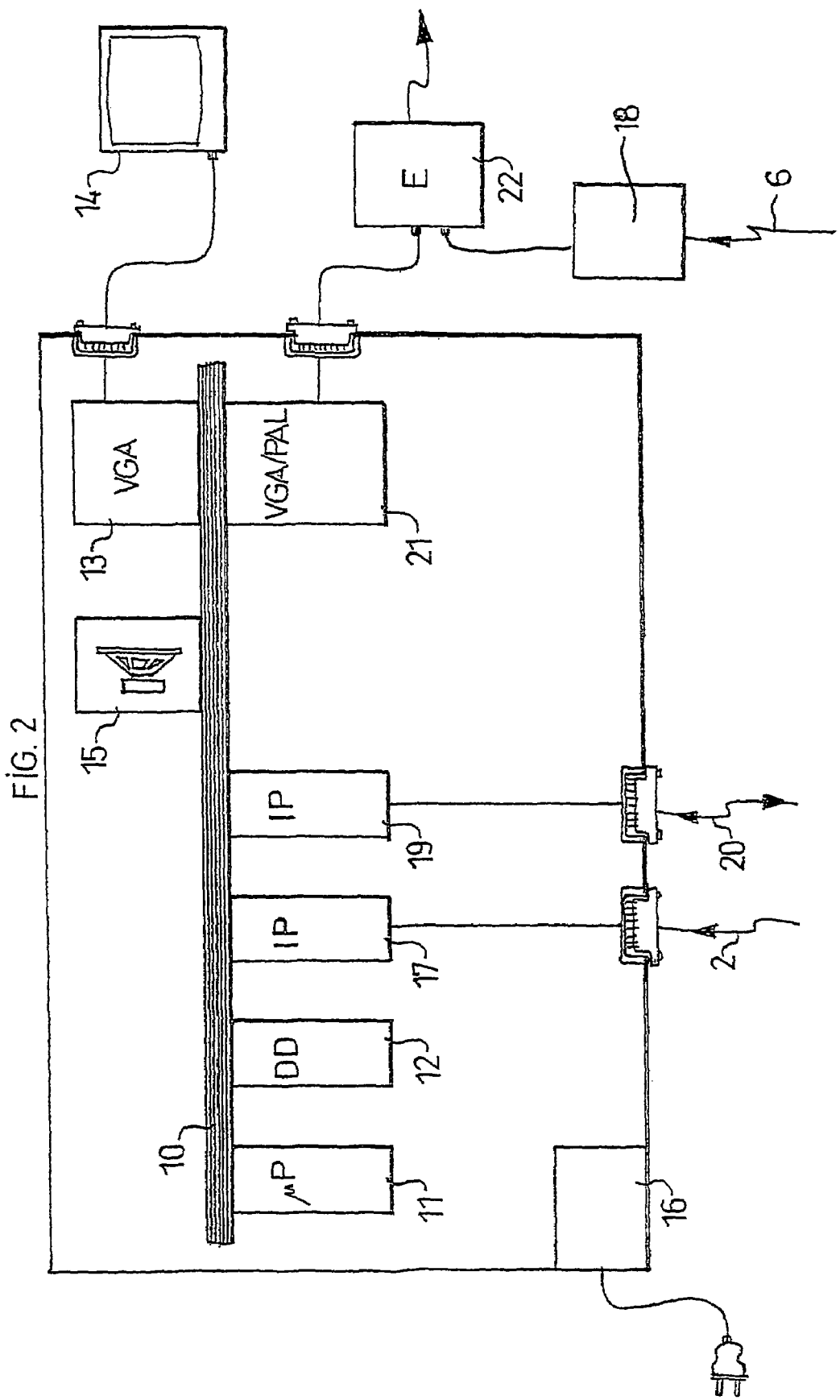

Other purposes, characteristics and advantages of the invention can be found by reading the following description, which refers to the attached figures, in which:

FIG. 1 is a block diagram of an example of a television network according to the invention, FIG. 2 is an hardware remote production example of a server device according to the invention.

In FIG. 1, a television network according to the invention is represented. This includes a main network TV1, which can be a network for transmission of television programs by cable and/or by microwave beam and/or by satellite, and thus broadcasts programs towards various television receivers (television viewers) RTV1, and if appropriate towards at least one secondary television network TV2, which can be a network for broadcasting television programs by cable and/or by microwave beam and/or by satellite, and itself broadcasts programs towards various other television receivers (television viewers) RTV2. In this way multiple television networks can be provided, in parallel or cascaded.

The television viewer's receivers RTV1, RTV2 are traditional television receivers, which can be captive (i.e. have no interactive functions).

The main television network TV1 includes, in particular, on at least one channel, a television video signal which is output by at least one server device STV1 according to the invention. In the represented example, two server devices STV1 are illustrated, each server device delivering a television video signal on one channel of the main television network TV1. Similarly, at least one server device according to the invention STV2 can output a video signal directly onto one channel of the secondary television network TV2, i.e. without passing through the main television network TV1.

Such a channel which is managed by a server device STV1, STV2 according to the invention can be of public type (received by any television viewer who is situated within the footprint of the channel and equipped with a receiver which is capable of receiving it) or private, by subscription, encrypted or not. The programs on this channel are output and remotely broadcast simultaneously and collectively to all the television viewers RTV1, RTV2 who are capable of and authorized for receiving this channel.

Each server device STV1, STV2 can be accessed for self-service by at least one remote producer OPi, who belongs to a group of remote producers OPi who are capable of and authorized for establishing communication with the server device STV1, STV2. The number of remote producers OPi who belong to the group of remote producers who are capable of and authorized for establishing communication with the server device STV1, STV2 can be predetermined and limited, or variable and unlimited, e.g. according to the issued connection authorizations or depending on the knowledge which the various potential remote producers may have of the existence of the server devices.

The various remote producers OPi of a single group of remote producers can be geographically close to each other, or on the other hand distributed in any way, for example throughout a region, a state, a continent or the world, depending on the geographical coverage of the television network(s) TV1, TV2.

Each remote producer has an IT station 1 (central processing unit, keyboard, screen, etc.) which is adapted to be able to establish direct communication via a transmission line 2 of a digital information transmission network, with a server device STV1, STV2 according to the invention. This transmission line 2 can be a line of a public or private network, dedicated or not, and adapted to allow the exchange of digital information according to any predetermined protocol between the remote producer OPi and the server device STV1, STV2. Preferably, the direct transmission line 2 is of a type which is compatible with the IP protocols. As examples, an Ethernet network line, a switched telephone network line, an ISDN line etc. can be mentioned. Thanks to this transmission line 2, the remote producer OPi can request and obtain communication with a server device STV1, STV2 with the intention of transmitting digital information to it, and of allowing remote control of the server device STV1, STV2 by the remote producer OPi who is thus connected via the transmission line 2.

As a variant or in combination, instead of the transmission line 2, the remote producer OPi can simply be adapted to establish a connection via the Internet network 3 to a server device STV1, STV2 according to the invention.

An example of a server device according to the invention is represented in FIG. 2. This device has a microcomputer central processing unit architecture comprising a bus 10, a motherboard 11 with microprocessor(s) and its various associated RAM and ROM components, mass memory in the form of, for example, a hard disk 12, a screen controller 13 which is capable of controlling at least one display device such as a screen 14, a sound card 15, a power supply 16. An input connection card 17 makes it possible to connect the server device to the direct transmission line 2. This card 17 can be a simple traditional modem card in the case in which the first transmission network which is formed by this line 2 is the switched telephone network. Any other appropriate network card can be used.

Additionally, the server device includes a third card 19, called the output connection card, for connection to the Internet network via a dedicated line or standard telephone line 20.

The device also includes at least one card 21 for automatic capture and conversion of graphic information which is addressed to the screen controller card 13 and processed by it, and of sound which is addressed to the sound card 15 and processed by it. This card 21 is adapted to generate a video signal which is compatible with the television network TV1, TV2. It supplies this video signal, automatically and without delay, to at least one transmitter 22 which is adapted to output the signal, automatically and without delay, on one channel of the corresponding network TV1, TV2. The card 21 supplies the video signal according to the television standard of the network TV1, TV2 (PAL, SECAM, etc.).

As means of automatic capture and conversion 21, for example an IN 1700 VGA/MAC box (INLINE, USA) can be used.

Thanks to such a box, all the sequences which are addressed to the screen controller 13 and sound card 15 (which are remotely produced live by a connected remote producer OPi, or deferred by one or more remote producer(s) who have remotely produced them in advance and recorded them on the mass memory 12 of the server device) are automatically and instantaneously output on the output video channel which is managed by this box 21, which is connected to the transmitter 22 to form the channel on which these sequences are therefore broadcast automatically, simultaneously and collectively to the television viewers RTV1, RTV2.

The server device which is represented in FIG. 2 is in the form of a closed box with its external connections to the lines 2, 20, 6 and the transmitter 22. Obviously, each connection card 17, 18, 19 can be in the form of an external device, and not an internal card which is connected directly to the bus 10.

Each transmitter 22 is adapted to the television network. In the case of a digital satellite television network, the transmitter 22 comprises, for example, an Mpeg2 EZCast® encoder marketed by PHILIPS and a Silver Skygate® multiplexer marketed by the Thomcast Multimedia And Digital Systems Unit company (CESSON-SEVIGNE, FRANCE).

Depending on the case, the transmitter 22 can be external to the server device box as shown or, as a variant, be incorporated in the server device box.

The server device is therefore an IT device which includes operating system software, preferably adapted and compatible with the digital information transmission networks (e.g. WINDOWS NT®, LINUX®, UNIX®, etc.).

The server device also includes software to manage the functions of these networks and the connection of the various remote producers. In particular, this network management software advantageously incorporates a module which allows the management of individual or collective access authorization codes and/or identification of each connected remote producer. For example, remote producers can be connected by entering an individual authorization code (LOGIN) and password. Any other means of identification and individual authentication can also be provided (electronic signature, personalized authentication card, etc.). The network management software also allows remote control of the server device by any connected remote producer. For example, the Microsoft NET MEETING® software can be used.

The server device also includes at least one software for navigation on the Internet network, making access to this Internet network possible from the server device itself, e.g. Microsoft Explorer®, Netscape®, etc.

Additionally and advantageously, the remote producer includes at least one video camera 5 and at least one microphone 4 which are connected to the IT station 1. Simultaneous transmission of pictures and sound via a transmission line 2 or via the Internet network is thus possible.

However, if improvement of the sound quality is desired, in particular for a live broadcast, an independent sound transmission line 6, in particular a line 6 of the switched telephone network, can be provided. The server device STV1, STV2 thus includes a device 18 for automatic connection to this independent sound transmission line 6. This device 18 allows automatic reception of sound from the line 6 and automatic transmission of this sound on the transmitter 22 of the television network channel. As an example of such a device, the SCOOP REPORTER II® equipment, marketed by the AETA company, CLAMART, FRANCE, can be mentioned. This equipment includes one input to connect an independent telephone line 6, and various audio outputs, including for example one output in Mpeg format, which can be connected to an audio input of an Mpeg2 encoder which is used as a transmitter 22 on the television channel. Thus the connected remote producer can, for example, comment live, with excellent audio quality, via the independent sound transmission line 6, on the information which is broadcast on the television channel. The independent sound transmission line 6 is thus simply a line of the switched telephone network.

In a variant which is not represented, a mixing console or switchboard can be placed between, on the one hand, the sound card 15 of the server device STV1, STV2 and the said automatic connection device 18, and on the other hand the transmitter 22, so that the broadcast sounds can come from the sound card 15, the said device 18, or both.

Additionally, each remote producer OPi can himself or herself be a television viewer, i.e. include at least one television receiver RTV1 and/or RTV2, so as to pick up the pictures which are output by one and/or the other of the television networks TV1, TV2.

Such a television receiver is advantageously provided in the case in which the remote producers can remotely broadcast programs live. Thus, in a network according to the invention, each remote producer OPi can be a television viewer, and conversely each television viewer who has an IT station 1 and connection means can be a remote producer OPi. Nevertheless, it should be noted that the programs which are remotely broadcast on the channel can be, and in general are, received identically, collectively and simultaneously by all the television viewers.

Additionally, various software for editing and/or displaying and/or using any graphic information can be loaded onto the server device, in such a way as to allow editing and remote production and combination of graphic and/or sound information sequences. Under this heading, all commercial software and software packages can be considered, particularly word processing, spreadsheets, screen picture editors (e.g. MICROSOFT POWERPOINT®), drawing software packages, photograph management software packages, video sequence managers, etc.).

The server device can also include at least one software for reception of graphic and/or sound information, particularly from a television channel, via the Internet network, e.g. the Real Player 7® software. In this way, sequences which are output by a television channel which is output from an Internet site can form or be incorporated in the sequences which are produced by a remote producer.

To facilitate remote production of sequences, the server device advantageously includes at least one video sequence production software, e.g. the Real Producer Pro® software, which also makes it possible to display these sequences, i.e. address them to the screen controller 13. This software also makes it possible to record programs on the hard disk 12 and to program deferred programs.

Other similar software can be used, e.g. the IFINISH® software.

The invention can be the subject of very many production variants in relation to the production method described above.

In particular, in the example mentioned above, each server device STV1, STV2 constitutes simultaneously a remote broadcasting device, the IT resources and connection means. However, these different functions can be separated onto distinct near or distant machines, which are linked by a network. In this case, the said IT resources can be adapted to connect automatically to a remote broadcasting device. The said IT resources can be formed, at least in part, of an Internet site and/or a remote producer station. Several machines can be provided, or even a network of machines, as IT resources for remote production of information sequences by the remote producers. Similarly, the input connection means can be multiplied to allow simultaneous connection of multiple remote producers.

The invention makes it possible to implement television channels, local or not, in which each television viewer can display information which has been remotely produced by any remote producer. This information can be very varied, since it can be output from any of the Internet network, specialized information from a remote producer, or even standard information which has been recorded in advance on a server device (e.g. a database).

All these functions are obtained at very low cost, since each remote producer can remotely produce his or her programs at a cost which corresponds only to the link to the server device. The invention allows, for example, remote broadcasting of video conferences by television, so that a remote producer who is connected to the server device can order connection of it to a network on which a video conference is broadcast, all the pictures and sounds of the video conference being remotely broadcast and received simultaneously and collectively by the various remote viewers who are capable of and authorized for receiving the television channel. In the same way, it makes it possible to carry out activities such as remote teaching, remote medicine, etc. by television or local television channels. The fact that the various information which is accessible on the Internet network (pages of Internet sites etc.) can be remotely broadcast to the television viewers encourages them to use the Internet network and familiarizes them with this network.

The invention claimed is:

1. A server device for self-service multiple-producer remote production and automatic remote broadcasting of programs on one channel of at least one television network which is intended for every television viewer who is capable of and authorized for receiving this channel, this server device comprising:
   at least one IT device, called the remote broadcasting device, comprising:
   a screen controller,
   means for automatic capture and conversion of graphic information sequences which are addressed to and processed by the screen controller, and are adapted to generate at least one video signal which represents these graphic information sequences and which is compatible with at least one television network,
   means for single-channel connection to a television network which is adapted to transmit, on the said channel, such a video signal which is output by the automatic capture and conversion means,
   IT resources and means, called input connection means, for connection to at least one first digital information transmission network, the IT resources and input connection means being adapted to:
   authorize the establishment of communication with at least one arbitrary distant remote producer, called the connected remote producer, who belongs to a group of remote producers who are capable of and authorized for establishing communication with the IT resources via at least one such first network, enabling this connected remote producer to access the IT resources remotely via the first network,
   form IT production means which can enable any connected remote producer to access at least part of the IT resources, and to remotely devise, construct, generate or otherwise produce, using these IT resources which he or she controls remotely via the input connection means, at least one sequence of graphic information which can be transmitted to a screen controller,
   transmit to the screen controller of at least one remote broadcasting device at least one sequence of graphic information which has been remotely produced by at least one remote producer, in such a way that this sequence is remotely broadcast on the television network channel.

2. The device as claimed in claim 1, wherein are comprised network management software means which allow remote control of the server device by any connected remote producer.

3. The device as claimed in claim 1, wherein the input connection means and IT resources are adapted to authorize, at each instant, establishment of communication with any one and only one arbitrary distant remote producer, who is the only one to access the IT resources and to be able to produce a graphic information sequence.

4. The device as claimed in claim 1, wherein the input connection means and IT resources are adapted to authorize, at each instant, establishment of communication with multiple different arbitrary distant remote producers.

5. The device as claimed in claim 4, wherein the IT resources are adapted to allow access to these IT resources, at each instant, by one and only one connected remote producer.

6. The device as claimed in claim 5, wherein the IT resources are adapted so that they can be shared, at each instant, by multiple connected remote producers.

7. The device as claimed in claim 1, wherein the IT resources, the means for automatic capture and conversion, and the single channel connection means are adapted to be able to output the video signal live.

8. The device as claimed in claim 1, wherein the IT resources include means for recording the graphic information sequences which at least one remote producer remotely produces, and means for programming the deferred remote broadcasting of these graphic information sequences.

9. The device as claimed in claim 1, wherein the input connection means are of the type with an access authorization code.

10. The device as claimed in claim 1, wherein the input connection means include means for identifying each connected remote producer, and the IT resources are adapted to record the identification of each connected remote producer and associate it with each graphic information sequence which he or she remotely produces.

11. The device as claimed in claim 1, wherein the first network is an IP-compatible network.

12. The device as claimed in claim 1, wherein the remote broadcasting device includes means, called sound card, which are capable of generating at least one sound signal, and wherein the remote broadcasting device is adapted to incorporate each sound signal from its output of the sound card into the video signal.

13. The device as claimed in claim 1, wherein are comprised means for establishing independent audio communication—in particular by telephone—between the connected remote producer and the single-channel connection means.

14. The device as claimed in claim 1, wherein the input connection means include means for receiving digital information which represents graphic and/or sound information which are transmitted by a connected remote producer, the IT resources being adapted to allow incorporation of this information in the remotely produced information sequences, and therefore in the video signal which is output and remotely broadcast on the said channel.

15. The device as claimed in claim 1, wherein are comprised software means which are adapted to receive audio and/or video information sequences via the first network, and to allow a connected remote producer to address these sequences to at least one screen controller and/or a sound card of at least one remote broadcasting device, with the intention of incorporating them in the video signal which is output and remotely broadcast on the said channel.

16. The device as claimed in claim 1, wherein the IT resources include software means which are capable of opening files which represent graphic and/or sound information, a connected remote producer being able to make the server device open software which makes it possible to edit and display text and/or pictures and/or graphic animation and/or display effects and/or video sequences and/or sound, making it possible to remotely produce sequences to be remotely broadcast on the said channel, with and on the IT resources of the server device.

17. The device as claimed in claim 1, wherein are comprised means, called output connection means, for output connection to at least one second digital information transmission network, these output connection means being adapted, like the IT resources, to enable a connected remote producer to access this second network from the server device to consult information and/or to load information remotely onto the server device, and then being addressed to at least one screen controller of at least one remote broadcasting device.

18. The device as claimed in claim 1, wherein a second network is an IP-compatible network and the IT resources include software means for navigating on this network.

19. The device as claimed in claim 1, wherein the input connection means include means for establishing communication according to at least one standard protocol—in particular H320 or H323—making transmission of video conferences by the server device possible.

20. The device as claimed in claim 1, wherein the single channel connection means are chosen from the means of connection to a cable television network, the means of connection to a microwave television network, the means of connection to a digital television network via satellite.

21. The device as claimed in claim 1, such that it is presented in the form of a box enclosing a microcomputer central processing unit architecture.

22. A television network, wherein is comprised at least one server device as claimed in claim 1.

* * * * *